(12) United States Patent
Horvitz et al.

(10) Patent No.: US 9,243,928 B2
(45) Date of Patent: *Jan. 26, 2016

(54) METHODS FOR AUTOMATED AND SEMIAUTOMATED COMPOSITION OF VISUAL SEQUENCES, FLOWS, AND FLYOVERS BASED ON CONTENT AND CONTEXT

(71) Applicant: Microsoft Corporation, Redmond, WA (US)

(72) Inventors: Eric J. Horvitz, Kirkland, WA (US); Raman K. Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

This patent is subject to a terminal disclaimer.

(21) Appl. No.: 13/769,276

(22) Filed: Feb. 15, 2013

(65) Prior Publication Data
US 2014/0055499 A1 Feb. 27, 2014

Related U.S. Application Data

(63) Continuation of application No. 12/559,884, filed on Sep. 15, 2009, now Pat. No. 8,386,946, which is a continuation of application No. 11/171,065, filed on Jun. 30, 2005, now Pat. No. 7,610,560.

(60) Provisional application No. 60/628,267, filed on Nov. 16, 2004.

(51) Int. Cl.
*G06F 17/00* (2006.01)
*G01C 21/36* (2006.01)
(Continued)

(52) U.S. Cl.
CPC ............ *G01C 21/3676* (2013.01); *G01C 21/36* (2013.01); *G06F 17/30056* (2013.01); *G06Q 10/06* (2013.01); *G06T 3/4092* (2013.01); *G06T 19/003* (2013.01)

(58) Field of Classification Search
CPC ....................... G06F 17/30056; G06F 3/04815
See application file for complete search history.

(56) References Cited

U.S. PATENT DOCUMENTS

| 4,276,029 A | 6/1981 | Gilson et al. |
| 5,375,059 A | 12/1994 | Kyrtsos et al. |

(Continued)

FOREIGN PATENT DOCUMENTS

| DE | 10057796 A | 5/2002 |
| DE | 10063763 A | 7/2002 |

(Continued)

OTHER PUBLICATIONS

Bay, et al. (1999) Detecting change in Categorical Data: Mining Contrast Sets. Knowledge Discovery and Data Mining, pp. 302-499.

(Continued)

*Primary Examiner* — Laurie Ries
(74) *Attorney, Agent, or Firm* — Sandy Swain; Judy Yee; Micky Minhas

(57) ABSTRACT

A system with the ability to dynamically compose a sequence of visual views or flows allowing a single object or region, or multiple objects or regions, to be viewed from different perspectives and visual distances is described. The sequence of views can provide smooth flyovers over positions and details on objects that are deemed to be of interest, with changes in zoom level and/or velocity that are functions of the estimated complexity and/or unfamiliarity with features of the object. In an example, a flyover displaying different views on a map of a city arterial system on a small-screened mobile device is composed based on current traffic conditions, swooping up and down with parabolic trajectories, based on distances being traversed, and pausing at times over key traffic jams and other findings of interest based on the estimated visual complexity and predicted atypicality of situations.

20 Claims, 14 Drawing Sheets

(51) Int. Cl.
*G06F 17/30* (2006.01)
*G06Q 10/06* (2012.01)
*G06T 19/00* (2011.01)
*G06T 3/40* (2006.01)

(56) References Cited

U.S. PATENT DOCUMENTS

| | | | |
|---|---|---|---|
| 5,493,692 A | 2/1996 | Theimer et al. | |
| 5,541,590 A | 7/1996 | Nishio | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,751,245 A | 5/1998 | Janky et al. | |
| 5,812,134 A * | 9/1998 | Pooser et al. | 715/848 |
| 5,812,865 A | 9/1998 | Theimer et al. | |
| 5,945,985 A | 8/1999 | Babin et al. | |
| 5,948,040 A | 9/1999 | DeLorme et al. | |
| 5,961,571 A | 10/1999 | Gorr et al. | |
| 5,999,882 A | 12/1999 | Simpson et al. | |
| 6,057,847 A | 5/2000 | Jenkins | |
| 6,111,539 A | 8/2000 | Mannings et al. | |
| 6,216,098 B1 | 4/2001 | Clancey et al. | |
| 6,256,577 B1 | 7/2001 | Graunke | |
| 6,317,686 B1 | 11/2001 | Ran | |
| 6,321,158 B1 | 11/2001 | Delorme et al. | |
| 6,353,398 B1 | 3/2002 | Amin et al. | |
| 6,360,168 B1 | 3/2002 | Shimabara | |
| 6,401,027 B1 | 6/2002 | Xu et al. | |
| 6,466,232 B1 | 10/2002 | Newell et al. | |
| 6,502,016 B1 | 12/2002 | Ozaki et al. | |
| 6,513,046 B1 | 1/2003 | Abbott, III et al. | |
| 6,522,325 B1 * | 2/2003 | Sorokin et al. | 345/427 |
| 6,549,915 B2 | 4/2003 | Abbott, III et al. | |
| 6,672,506 B2 | 1/2004 | Swartz et al. | |
| 6,735,549 B2 | 5/2004 | Ridolfo | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,785,606 B2 | 8/2004 | Dekock et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,813,555 B1 | 11/2004 | Kerner | |
| 6,837,436 B2 | 1/2005 | Swartz et al. | |
| 6,842,877 B2 | 1/2005 | Robarts et al. | |
| 6,879,969 B2 | 4/2005 | Engstroem et al. | |
| 6,938,203 B1 | 8/2005 | Dimarco et al. | |
| 7,006,866 B1 | 2/2006 | Deco et al. | |
| 7,010,501 B1 | 3/2006 | Roslak et al. | |
| 7,012,614 B2 | 3/2006 | Chalfin et al. | |
| 7,040,541 B2 | 5/2006 | Swartz et al. | |
| 7,063,263 B2 | 6/2006 | Swartz et al. | |
| 7,069,258 B1 | 6/2006 | Bothwell | |
| 7,098,805 B2 | 8/2006 | Meadows et al. | |
| 7,103,470 B2 | 9/2006 | Mintz | |
| 7,149,716 B2 | 12/2006 | Gatto | |
| 7,171,378 B2 | 1/2007 | Petrovich et al. | |
| 7,195,157 B2 | 3/2007 | Swartz et al. | |
| 7,317,449 B2 | 1/2008 | Robbins et al. | |
| 7,500,202 B2 * | 3/2009 | Gerba et al. | 715/856 |
| 7,698,055 B2 | 4/2010 | Horvitz et al. | |
| 7,831,532 B2 | 11/2010 | Horvitz | |
| 8,131,648 B2 | 3/2012 | Barton | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0056443 A1 | 12/2001 | Takayama et al. | |
| 2002/0026278 A1 | 2/2002 | Feldman et al. | |
| 2002/0032689 A1 | 3/2002 | Abbott et al. | |
| 2002/0044152 A1 | 4/2002 | Abbott et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott et al. | |
| 2002/0054174 A1 | 5/2002 | Abbott et al. | |
| 2002/0080155 A1 | 6/2002 | Abbott et al. | |
| 2002/0080156 A1 | 6/2002 | Abbott et al. | |
| 2002/0082767 A1 | 6/2002 | Mintz | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0009270 A1 | 1/2003 | Breed | |
| 2003/0046401 A1 | 3/2003 | Abbott et al. | |
| 2003/0065409 A1 | 4/2003 | Raeth et al. | |
| 2003/0069683 A1 | 4/2003 | Lapidot et al. | |
| 2003/0154476 A1 | 8/2003 | Abbott et al. | |
| 2003/0191568 A1 | 10/2003 | Breed | |
| 2003/0204308 A1 | 10/2003 | Uchida | |
| 2004/0122702 A1 | 6/2004 | Sabol et al. | |
| 2004/0128317 A1 | 7/2004 | Sull et al. | |
| 2004/0153445 A1 | 8/2004 | Horvitz et al. | |
| 2004/0201500 A1 | 10/2004 | Miller et al. | |
| 2004/0257440 A1 | 12/2004 | Kondo et al. | |
| 2005/0034078 A1 | 2/2005 | Abbott et al. | |
| 2005/0060069 A1 | 3/2005 | Breed et al. | |
| 2005/0060647 A1 | 3/2005 | Doan et al. | |
| 2005/0065711 A1 | 3/2005 | Dahlgren et al. | |
| 2005/0090938 A1 | 4/2005 | Ranelli | |
| 2005/0107993 A1 | 5/2005 | Cuthbert et al. | |
| 2005/0108322 A1 | 5/2005 | Kline et al. | |
| 2005/0195154 A1 | 9/2005 | Robbins et al. | |
| 2005/0203927 A1 | 9/2005 | Sull et al. | |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0036568 A1 | 2/2006 | Moore et al. | |
| 2006/0089787 A1 | 4/2006 | Burr et al. | |
| 2006/0106530 A1 | 5/2006 | Horvitz et al. | |
| 2006/0106599 A1 | 5/2006 | Horvitz | |
| 2006/0149728 A1 | 7/2006 | Error et al. | |
| 2007/0050719 A1 | 3/2007 | Lui et al. | |
| 2007/0113172 A1 | 5/2007 | Behrens et al. | |
| 2007/0192739 A1 | 8/2007 | Hunleth et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2011/0071964 A1 | 3/2011 | Horvitz | |

FOREIGN PATENT DOCUMENTS

| | | |
|---|---|---|
| DE | 10110549 A | 9/2002 |
| DE | 102004015880 A | 11/2004 |
| DE | 10336590 A | 2/2005 |
| JP | 11238194 A | 8/1999 |
| JP | 2004234649 A | 8/2004 |
| JP | 2004317160 A | 11/2004 |
| WO | 9800787 A | 1/1998 |

OTHER PUBLICATIONS

Billinghurst, et al., An Evaluation of Wearable Information Spaces, Proceedings of the Virtual Reality Annual International Symposium, 1998, 8 pages.

Billinghurst, et al., Wearable Devices: New Ways to Manage Information, IEEE Computer Society, Jan. 1999, pp. 57-64.

Billinghurst, Research Directions in Wearable Computing, University of Washington, May 1998, 48 pages.

Chen, et al., A Survey of Context-Aware Mobile Computing Research, Dartmouth Computer Science Technical Report 2000, 16 pages.

Chickering, et al. (1997) A Bayesian approach to learning Bayesian networks with local structure. In Proceedings of Thirteenth Conference on Uncertainty in Artificial Intelligence, 80-89.

Dumont, Reynald, et al, "Perceptuallly-Driven Decision Theory for Interactive Realistic Rendering", Apr. 2003, Transactions on Graphics (TOG), vol. 22, Issue 2, pp. 152-181.

European Search Report dated Apr. 26, 2007 for European Patent Application Serial No. 05 10 9793, 2 pages.

(56) References Cited

OTHER PUBLICATIONS

Harter, et al., A Distributed Location System for the Active Office, IEEE Network, 1994 pp. 62-70.
Heckerman, et al. (1995) Learning Bayesian Networks: A Unification for Discrete and Gaussian Domains, Proceedings of UAI 95, pp. 274-284.
Heckerman, et al. (1995) Learning Bayesian Networks: A Unification for Discrete and Gaussian Domains. Proceedings of UAI 95, pp. 274-284.
Horvitz, et al. (1995) Display of Information for Time-Critical Decision Making. Proceedings of the Eleventh Conference on Uncertainity in Artifical Intelligence. Morgan Kaufmann Publishers, 296-305.
Horvitz, et al., Attention-Sensitive Alerting in Computing Systems, Microsoft Research, Aug. 1999.
Horvitz, et al., In Pursuit of Effective Handsfree Decision Support: Coupling Bayesian Inference, Speech Understanding, and User Models, 1995, 8 pages.
International Search Report dated Jan. 11, 2007 for International Patent Application No. PCT/US06/25167, 3 pages.
International Search Report dated Sep. 29, 2003 for PCT Application Serial No. 00/20685, 3 pages.
Joachims, Text categorization with support vector machines: learning with many relevant features, Machine Learning, European Conference on Machine Learning, Apr. 21, 1998, pp. 137-142.
Lingras, et al. (2000) "Traffic Volume Time-Series Analysis According to the Type of Road Use" Computer-Aided Civil and Infastructure. pp. 365-373.
Losee, Jr., Minimizing information overload: the ranking of electronic messages, Journal of Information Science 15, Elsevier Science Publishers B.V., 1989, pp. 179-189.
Meek, et al. (2002). Staged Mixture Modeling and Boosting. Proceedings of the UAI 2002, pp. 335-343.
Nodelman, et al. Continuous Time Bayesian Networks for Inferring Users' Presence and Activities with Extensions for Modeling and Evaluation, Microsoft Research Technical Report MSR-TR-2003-97, Dec. 2003.
Nodelman, et al (2003). Learning Continuous Time Bayesian Networks. Proceedings of the UAI 2003, pp. 451-458.
OA dated Aug. 13, 2008 for U.S. Appl. No. 11/172,581, 33 pages.
OA dated Oct. 3, 2008 for U.S. Appl. No. 11/165,070, 11 pages.
Rhodes, Remembrance Agent: A Continuously Running Automated Information Retrieval System, The Proceedings of the First International Conference on the Practical Application of Intelligent Agents and Multi Agent Technology, 1996, pp. 487-495.
Rhodes, The Wearable Remembrance Agent: A System for Augmented Theory, Personal Technologies Journal Special Issue on Wearable Computing, 1997, 12 pages.
Rhodes, The Wearable Remembrance Agent: A System for Augmented Theory, The Proceedings of the First International Symposium on Wearable Computers, Oct. 1997, pp. 123-128.
Robbins, et al., (2004). ZoneZoom: Map Nagivation with Smartphones with Recursive View Segmentation, Advanced Visual Interfaces, AVI 2004, Gallipoli, Italy, May 2004.
Schilit, A System Architecture for Context-Aware Mobile Computing, Columbia University, 1995, 153 pages.
Schilit, et al., Context-Aware Computing Applications, In Proceedings of the Workshop on Mobile Computing Systems and Applications, Dec. 1994, pp. 85-90.
Schilit, et al., Customizing Mobile Applications, Proceedings USENIX Symposium on Mobile and Location Independent Computing, Aug. 1993, 9 pages.
Schilit, et al., Disseminating Active Map Information to Mobile Hosts, IEEE Network, 1994, pp. 22-32, vol. 8—No. 5.
Schilit, et al., The ParcTab Mobile Computing System, IEEE WWOS-IV, 1993, 4 pages.
Spreitzer, et al., Architectural Considerations for Scalable, Secure, Mobile Computing with Location Information, In the 14th International Conference on Distributed Computing Systems, Jun. 1994, pp. 29-38.
Spreitzer, et al., Providing Location Information in a Ubiquitous Computing Environment, SIGOPS '93, 1993, pp. 270-283.
Spreitzer, et al., Scalable, Secure, Mobile Computing with Location Information, Communications of the ACM, Jul. 1993, 1 page, vol. 36—No. 7.
Starner, Wearable Computing and Contextual Awareness, Massachusetts Institute of Technology, Jun. 1999, 248 pages.
Theimer, et al., Operating System Issues for PDAs, In Fourth Workshop on Workstation Operating Systems, 1993, 7 pages.
Vandaele, et al. (2000). A Queuing-Based Traffic Flow Model: Transportation Research-D: Transportation and Environment, 5(2), pp. 121-135.
Want, Active Badges and Personal Interactive Computing Objects, IEEE Transactions on Consumer Electronics, 1992, 11 pp., vol. 38—No. 1.
Want, et al., The Active Badge Location System, ACM Transactions on Information Systems, Jan. 1992, pp. 91-102 vol. 10—No. 1.
Want, et al., The Active Badge Location System, ASM Transactions on Information Systems, Jan. 1992, pp. 91-102 vol. 10—No. 1.
Weiser, Some Computer Science Issues in Ubiquitous Computing, Communications on the ACM, Jul. 1993, pp. 75-84. vol. 36—No. 7.
Weiser, The Computer for the 21st Century, Scientific American, Sep. 1991, 8 pages.
Wong, et al. (2003). Bayesian Network Anomaly Pattern Detection for Disease Outbreaks. ICML 2003: 808-815.
Workshop on Wearable Computing Systems, Aug. 19-21, 1996.
"Non-Final Office Action Issued in U.S. Appl. No. 13/799,711", Mailed Date: Jun. 3, 2015, 14 Pages.
Notice of Allowance in U.S. Appl. No. 13/799,711, Mailed Date: Oct. 28, 2015, 9 Pages.

\* cited by examiner

METHODS FOR AUTOMATED AND SEMIAUTOMATED COMPOSITION OF VISUAL SEQUENCES, FLOWS, AND FLYOVERS BASED ON CONTENT AND CONTEXT

REFERENCE TO RELATED APPLICATIONS

This application is a continuation of U.S. patent application Ser. No. 12/559,884, filed Sep. 15, 2009, entitled "METHODS FOR AUTOMATED AND SEMIAUTOMATED COMPOSITION OF VISUAL SEQUENCES, FLOWS, AND FLYOVERS BASED ON CONTENT AND CONTEXT", which is now U.S. Pat. No. 8,386,946, issued Feb. 26, 2013, which is a continuation of U.S. patent application Ser. No. 11/171,065, filed Jun. 30, 2005, entitled "METHODS FOR AUTOMATED AND SEMIAUTOMATED COMPOSITION OF VISUAL SEQUENCES, FLOWS, AND FLYOVERS BASED ON CONTENT AND CONTEXT", which is now U.S. Pat. No. 7,610,560, issued Oct. 27, 2009, which claims the benefit of U.S. Prov. App. No. 60/628,267, filed Nov. 16, 2004, entitled "SYSTEM AND METHOD FOR PREDICTION AND PRESENTATION OF ATYPICAL EVENTS". The entirety of each of these aforementioned applications is incorporated herein by reference.

This application is also related to U.S. patent application Ser. No. 11/171,063, entitled "PRECOMPUTATION AND TRANSMISSION OF TIME-DEPENDENT INFORMATION FOR VARYING OR UNCERTAIN RECEIPT TIMES", filed Jun. 30, 2005, which is now U.S. Pat. No. 7,831,532, issued Nov. 9, 2010; U.S. patent application Ser. No. 11/172,581, entitled "BUILDING AND USING PREDICTIVE MODELS OF CURRENT AND FUTURE SURPRISES", filed Jun. 30, 2005, which is now U.S. Pat. No. 7,519,564, issued Apr. 14, 2009; and U.S. patent application Ser. No. 11/171,791, entitled "TRAFFIC FORECASTING EMPLOYING MODELING AND ANALYSIS OF PROBABILISTIC INTERDEPENDENCIES AND CONTEXTUAL DATA", filed on Jun. 30, 2005, which is now U.S. Pat. No. 7,698,055, issued Apr. 13, 2010. The entirety of each of these afore-mentioned related applications is also incorporated herein by reference.

BACKGROUND

The evolution of computing devices from high-cost, low performance data processing systems to low cost, high-performance communication, problem solving, and entertainment systems has provided a cost-effective and time saving means to lessen the burden of performing every day tasks such as correspondence, bill paying, shopping, budgeting, and information gathering. For example, a computing system interfaced to a network by way of wire and/or wireless technology can provide a user with a channel for nearly instantaneous access to a wealth of information. For instance, mobile telephones can be configured to receive updates with respect to sporting events, traffic, stocks, mutual funds, sales events with respect to particular stores, etc. Thus, a vast amount of information can now be provided to a mobile user by way of a mobile device, such as a cellular telephone, a smartphone, a personal digital assistant (PDA), a laptop computer, and the like.

Various deficiencies exist with respect to viewing applications upon such mobile devices. In particular, screen sizes often associated with the devices are quite small, thereby failing to provide a user with adequate context with respect to a viewed object. For example, portable devices can be provided with a mapping application that can display a map of a geographic region. Rendering the map to enable a user to view such map and obtain desired data therefrom, however, is difficult due to a small size of a display region. For instance, the user may desire to view a portion of particular road, but upon viewing such road the user lacks context associated with the road. Specifically, the user may not be able to determine location of freeways, bridges, and other entities related to the road. In another example, if a substantial amount of geographic region is provided to a user on a small display region, then details desirably viewed by the user may not be available. For instance, road names may be indiscernible and/or not provided, and roads or geographic regions of interest to a user can be completely omitted from the map.

To make up for some of these deficiencies, manual mechanisms for altering a display region have been provided for utilization with mobile devices. Therefore, for example, a user can manually cause altitude of a displayed image to alter with respect to such user. More specifically, through depressing one or more buttons or selecting a function, images upon a display can be subject to enlargement or reduction. Furthermore, regions can be traversed over through manually entering commands or depressing one or more buttons. Thus, users can view desired regions to retrieve information of interest to such users through manual actions. Requiring a user to manually traverse an object and/or region, however, can be problematic. In particular, as devices become increasingly diminutive, probabilities of accidentally depressing an undesired key (thereby resulting in effectuation of unwanted functionality) can increase. Accordingly, usability of a mapping application or similar application can be negatively affected, and user angst directed towards such application can be rapidly intensified. Furthermore, multi-tasking is made more difficult by necessitating manual interaction with a mobile device to view a region in an acceptable context.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later. Additionally, section headings used herein are provided merely for convenience and should not be taken as limiting in any way.

The claimed subject matter relates to systems and methods for composing, in an automated or semi-automated manner, a sequence of visual views or flows allowing a single object or region, or multiple objects or regions, to be viewed from different perspectives and visual distances. The sequence of visual views and/or flows can be applied to contiguous two or three dimensional objects, such as flat maps or relief maps containing such information as topographical detail and building structures. Moreover, a sequence of visual views and/or flows can be applied to abstract data structures such as calendar and task information. In one example, a cinematographical flyover can be composed to display on a small-screened mobile device. Thus, for instance, a user can be provided with a tour over a city's traffic arterial system, wherein the user can be provided with a sequence of views that provide the user with a sensation of swooping down and pausing at times over key traffic jams, for example, and other findings of interest with regards to traffic flow. These views, however, can be provided with any suitable two or three dimensional rendering of objects.

Furthermore, with close up views of a set of traffic hotspots (e.g., regions of a roadway or roadways that are of interest to a user and/or are associated with a traffic incident) can be provided to a user, wherein the views depends on a current traffic situation. In a more general case, any route of travel upon a mobile device (e.g., travel along a roadway represented graphically, travel between points on a calendar, . . . ) can be associated with various views, wherein a perceived altitude associated with points along the route changes. Such alteration of perceived altitude can be seen as analogous to flying, wherein altitude along the route is relatively low at beginning of traversal and at an end of traversal and relatively high between the beginning and end. For instance, the changes in perceived altitude can be parabolic or semi-parabolic in nature. Such a system and/or method can be designed in accordance with human visual and memory systems, thereby providing a user with greater context and understanding of a route of travel.

In one example, the route of travel can relate to a route along a map. The map can include various roadways, and a route along the map can be explicitly defined by a user and/or inferentially defined through analysis of historical data and/or contextual data. Data can be obtained for analysis through utilization of various sensing and data collection techniques. For example, data can be obtained from a mobile unit, such as a cellular telephone, through a location sensor (e.g., a GPS sensor) associated therewith. Similarly, data can be obtained from mobile units by monitoring use thereof. Thus, times associated with a user viewing graphical depictions of travel along routes can be obtained, collected, and analyzed to determine when and/or where to provide the user with additional graphical depictions.

In another example, points of interest along a route can be defined. Such definition can occur explicitly by a user, through analysis of contextual data together with one or more rules, or inferentially. For example, the user can explicitly define a point of interest as being a certain portion of a roadway, an intersection, etc. In another instance, the user can a define point of interest as being any portion of roadway that is associated with a threshold level of traffic congestion. In yet another example, an intelligent component can make a probabilistic determination that the user would be interested in an accident along the roadway, and define location of such accident as a point of interest. Moreover, a perceived velocity of travel along a route can be altered as a function of location of a point of interest. For instance, a graphical depiction of travel can slow and/or pause temporarily upon reaching a point of interest.

In still another example, a system that facilitates displaying traversal of a route includes a user interface engine component that receives display content, and a rendering component that utilizes the display content to render a graphical depiction of travel along the route such that a perceived altitude above the route changes.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
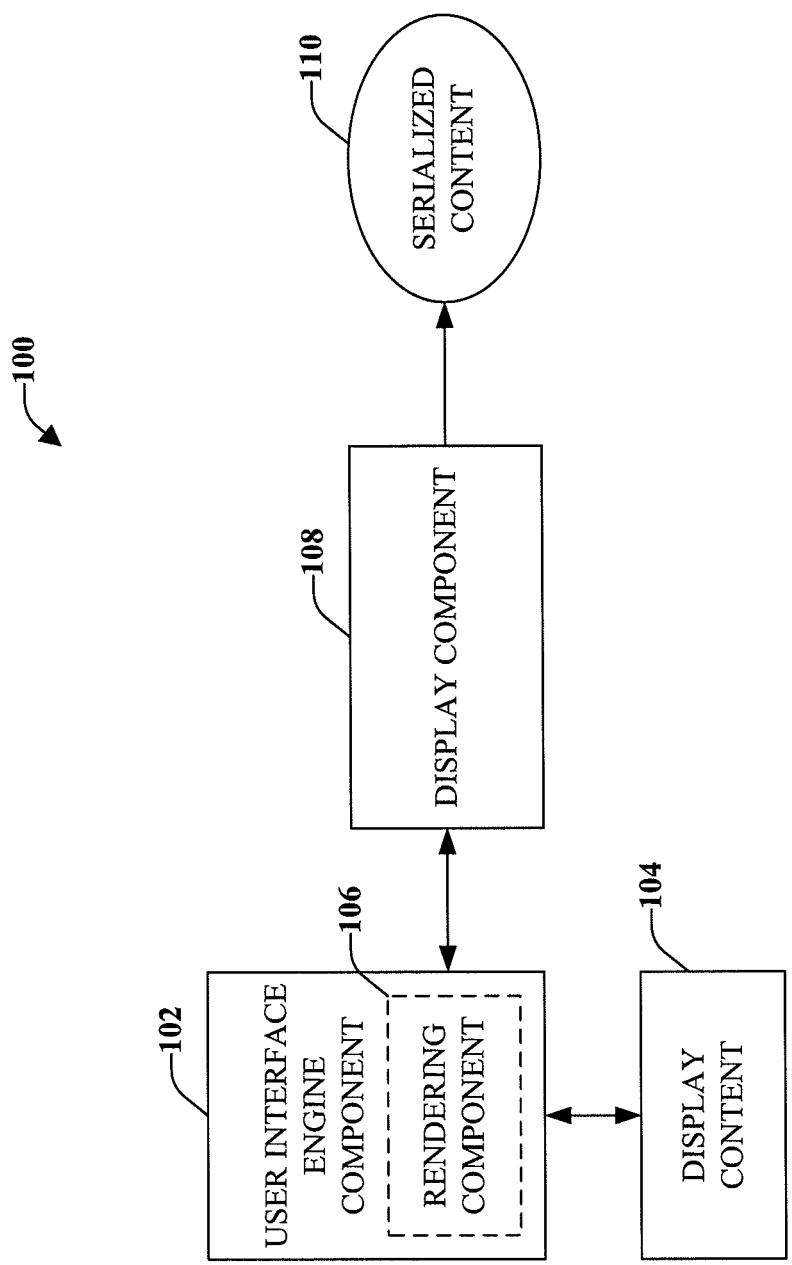
FIG. 1 is a high-level block diagram of a system that facilitates graphically depicting travel along a route.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Automated reasoning and prediction systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

Furthermore, the claimed subject matter may be implemented as a method, apparatus, or article of manufacture using standard programming and/or engineering techniques to produce software, firmware, hardware, or any combination thereof to control a computer to implement the disclosed claimed matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The claimed subject matter will now be described with respect to the drawings, where like numerals represent like elements throughout. While the description presented herein makes reference to visual traversal along a route upon mobile device screens (and other relatively small displays), it is understood that the claimed subject matter relates to automated flowing of views and/or sequences of detailed portions of visual content (whether the views are onto aspects of a single object like a map or onto visual representations of more abstract data structures like a calendar, appointments, and tasks) through small potentially limited sized displays. The systems, methods, apparatuses, and articles of manufacture described herein can employ and draw upon power of the human visual system together with cognitive abilities of human beings to understand relationships among disparate view perspectives and zooms that are displayed in connection with providing a user with a sequence or flow of views. For example, humans tend to saccade on disparate portions of a scene, and their high-resolution visual capture is on a relatively small visual angle of the fovea of the retina. Although users eye positions alter and "foveate" on disparate regions of the world, humans have an innate ability to build up a sense that they are "reviewing a whole." In other words, humans compose larger cognitive views onto the world. The claimed subject matter relates to leveraging our cognitive abilities to provide the sense of "reviewing the whole" by way of the "fovea" of a small screen, and relay cues about views via clear flows, velocity alterations, and transitions.

Referring now to FIG. 1, a system 100 that facilitates automatic view traversal, wherein perceived altitude of a route of travel is altered as a function of at least a beginning point of traversal and an end point of traversal. The system 100 includes a user interface engine component 102 that receives display content 104 that is desirably presented to a user. For example, the display content 104 can relate to a map of a geographic region, a surface of an object, a surface of a calendar, or the like. The display content 104 can be resident upon a device together with the user interface engine component 102. In particular, a mobile device can include memory that stores the display content 104, and the user interface engine component 102 can access the display content 104, by way of example, over a local bus (not shown). Any alterations in the display content 104 (e.g., altering colors of shapes or images therein) can be provided by a server through a network.

The user interface engine component 102 can include a rendering component 106 that renders display information to a display component 108. The display component 108 can output serialized content 110; providing a user with a context of flying over a route. For instance, the route can be a route associated with a map, a surface, or the like, and can be pre-defined or determined through inference as a function of previous user and current context. These aspects are described in greater detail below. In summary, the user interface engine component 102 and the rendering component 106 can provide a user with an automatic traversal of a route (predefined, inferred, or a combination thereof), thereby lessening deficiencies associated with manual viewing systems on mobile devices. In other words, the user interface engine component 102 and the rendering component 106 can essentially cause a small display to seem larger (e.g., provide information to a user as if the screen was large) by way of displaying multiple views over time, with selective management of detail based upon what is deemed most important. Disparate views can be conceptually or geometrically connected (per angles and transitions) to provide a user with a seamless flyover.

In one example, the user interface engine component 102 and the rendering component 106 can be employed to alter a perceived altitude associated with the route according to viewing position of the route. This alteration of perceived altitude can be designed in accord with observations relating to the human visual system as well as human memory. For instance, it has empirically been determined that humans can visualize and remember with clarity between six and eight percent of the visual field. Given this statistic and other observations relating to human sight and memory, the rendering component 106 can alter depth of view of a route to provide users with improved viewing of graphics upon the display component 108. For example, at a beginning point of the route, the rendering component 106 can cause the display component 108 to be associated with a field of depth that provides a user with a perception of being physically near such beginning point. As the route is traversed, the rendering component 106 can cause the display component 108 to provide graphics that give the user a perception of rising above the route. Speed of traversal and rate of alteration with respect to perceived altitude (e.g. "zoom") can be defined by a user and/or chosen automatically as a function of previous user input and/or human vision and memory capabilities. For instance, traversing a route too quickly may not enable a user to retrieve and analyze parameters of the route, while traversing a route too slowly may cause a user to become impatient with the system 100 and refrain from future utilization thereof.

In still more detail relating to an amount of time to display an image within a sequence or flow to a user, a model of an amount of time that a user requires to absorb information about a detail a view is trying to transmit to a user can be learned (through machine learning techniques). For instance, contextual data, data from a user, and/or known data relating to human visual abilities and cognitive abilities can be collected, and a model can be generated based at least in part thereon. The model can be based at least in part upon complexity of the view and/or user familiarity with contents of the view. For instance, if the view is displaying traffic/roadway information, a number of intersecting roads, a current traffic status on the roads, predicted inferences about traffic on roads, and the like. In still more detail, Inferences about traffic on roads can be utilized as arguments to a measure of complexity, and this measure can be employed to slow down, dwell, and zoom over a particular region. If a surprise on a roadway is predicted, then inferences relating to a level of surprise to a user can be utilized to slow down a "flyover" over regions where there are surprises, where the "flyover" is a serialized sequence of views given a user a sensation of flying over a region. With regard to user familiarity with a view, if a user is executing a flyover that has been previously executed, and contents displayed in views of the flyover are unchanged, then familiarity is great and the flyover can be executed more quickly, except for portions of the flyover that have been altered.

Perceived altitude associated with the output serialized content 110 can continue to rise until a threshold is met and/or until a point of interest and/or end point of the route is neared. The rendering component 106 can then cause the display component 108 to output the serialized content 110 in such a manner that the perceived altitude reduces. Thus, the user may feel that they are continuously becoming more physically proximate to a point of interest and/or end point of the route. To describe such traversal in an analogy, the rendering component 106 can provide a user with a perception of flying, wherein the user departs from an initial point and steadily gains altitude, and then descends until an end point is reached. The perceived alteration in altitude can be parabolic and/or quasi-parabolic in nature, wherein such the parabolic function is based at least in part upon distance between a beginning point and an end point, a beginning point and a point of interest, a point of interest and an end point, and between two points of interest. Moreover, the parabolic function utilized to determine perceived altitude and rate of change thereof can be based at least in part upon a weight provided to points of interest, wherein points of interest with a greater weight can be provided to a user more closely than points of interest associated with lesser weights. Furthermore, speed of traversal of an entirety of a route and/or over portions of a route can be a function of weights provided to certain points within the route (e.g., points of interest).

As alluded to above, the display component 108 displays such traversal through utilization of the serialized content 110, thereby providing a user with a sense of continuous motion. The serialized content 110 can give a user an impression of flying between a beginning and end portion of a route, with altered altitude associated with points of interest as well as alterations in speed of traversal of the route. The serialized content 110 is generated and output in accordance with empirical data relating to human vision and memory, providing users with greater context when viewing data on displays associated with mobile units. As described above, however, the claimed subject matter is not to be limited to automatic visualization of traversal of a route, as traversal of a route is merely an example of such claimed matter. Rather, the claimed subject matter is intended to encompass automated flowing of views and/or sequences of detailed portions of visual content through small displays based at least in part upon the human visual system and cognitive abilities.

Figure 2:
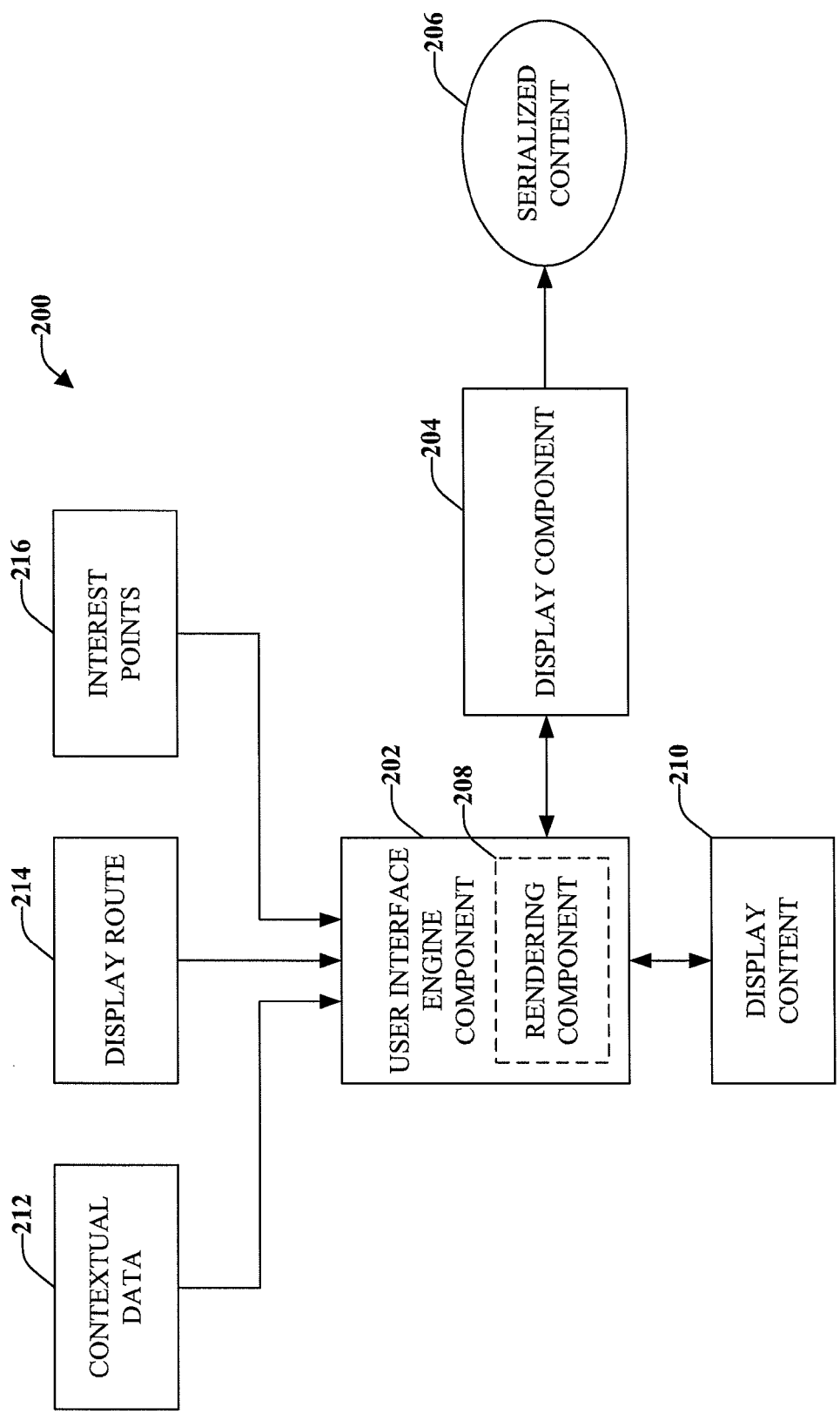
FIG. 2 is a block diagram of a system that facilitates generating a graphical depiction of travel along a route as a function of contextual data and points of interest.

Turning now to FIG. 2, a system 200 that facilitates displaying a flyover to a user on a mobile device is illustrated. The system 200 includes a user interface engine component 202 that is communicatively coupled to a display component 204, wherein the display component 204 is employed to output serialized content 206 with respect to a route to a user. A rendering component 208 associated with the user interface engine component 202 can output data in a serial nature to the display component 204, thereby allowing the display component 204 to output the serialized content 206 to a user and providing a seamless traversal of a route. The route can be, but is not limited to being, a route upon a map, a route over an object, or any other suitable route. For a specific example, the route can be a route between microscopic organisms captured by way of a microscope/camera. Accordingly, the serialized content 206 can be a serialized display of traversal over any suitable object.

The user interface engine component 202 is associated with a rendering component 208 that utilizes display content 210 to generate content to be displayed by the display component 204. For example, the display content 210 can be a map of a particular region, wherein such map can be associated with disparate perceived altitudes. In other words, the display content 210 can be subject to "zooming", thereby enabling portions of the display content 210 to be viewed at disparate levels of granularity. In one example, the display content 210 can be locally stored in memory within a portable unit, such as a mobile telephone. If portions of the display content 210 are desirably altered, effectuation of alteration can occur by way of commands from a server, wherein the commands relate to coordinates of the display content 210 that are desirably altered. Thus, an entirely new region need not be rendered by the rendering component 208 given a desired alteration to such region, as the display content 210 is stored locally in memory. An alteration may be utilized, for instance, to inform a user of a condition upon a map (e.g., location of an accident, traffic congestion, . . . ).

The user interface engine component 202 and the rendering component 208 can employ contextual data 212, a display route 214, and interest points 216 in connection with outputting the serialized content 206 by way of the display component 204. For example, the contextual data 212 can include time of day, day of week, and the like, and can be utilized to automatically initiate display of a route. In one example, the display content 210 can include a map of roadways, wherein such map can indicate traffic patterns thereon. At a certain time of day, a user may wish to review a route from a place of business to a place of residence to enable such user to make a determination relating to when to travel between the two. This time of day can be learned and utilized by the user interface engine component 202, as well as other contextual data. The contextual data can be achieved, for example, by logging activity associated with a mobile unit that utilizes the system 200. For instance, times associated with employment of the system 200, frequency of employment of the system 200, locations when the system 200 is employed, and the like can be contextual data 212.

The display route 214 can be a route prescribed by a user and/or an inferred route that is built by way of the contextual data 212. For example, an intelligent model trained by one or more classifiers can be utilized to predict a desired route to be displayed. In one example, the display route 214 can include a sequence of roadways typically driven between locations. In another instance, the display route 214 can be a sequence of rides at an amusement part. Thus, any suitable route is contemplated and intended to fall under the scope of the hereto-appended claims.

Like the display route 214, the interest points 216 can be defined by a user, determined through analysis of rules and current context, and/or inferred by way of analysis of contextual data in light of historical data. For instance, a predictive model, based on a learned Bayesian Network, another statistical classification model, or other suitable intelligent algorithm can be employed to select the interest points 216 (e.g., points on the display route 214 that are of interest to a user). In an example where the interest points 216 are defined by a user, such user may wish to more closely review a particular intersection that is on a travel route. In another example, rules can be employed to determine whether a point of interest exists. For instance, any time an accident occurs on a specified route, a location of the accident can be a point of interest. Similarly, when congestion traffic congestion reaches a threshold, a location of such congestion can be a point of interest. In still yet another example, while not explicitly defined as an interest point or by way of a rule, an intelligent algorithm can make a probabilistic determination that a predicted congestion at a portion of roadway upon a travel route is an interest point. In other words, a structure of a flyover provided to a user can be based at least in part upon a current or predicted situation. For example, in a traffic context, locations on a map that are not currently associated with interesting inferences (or portions defined as interesting by a user) and/or are not associated with traffic jams are not points of interest—thus the flyover can go quickly over regions not associated with a traffic jam or point of interest and/or can exclude such regions entirely from a flyover. Thus, a route or flyover can be dynamically composed of interesting points (as defined by a user, inferred, or associated with contextual data that causes a point to be interesting). With further regard to flyovers, such flyovers can be context dependent. For instance, a flyover can be time-dependent, depending on goals of a user per a configuration. In a more detailed example, a user can configure the system 200 so that a flyover visits portions of a map that are relevant for a morning or evening commute.

The user interface engine component 202 and the rendering component 208 can create the serialized content 206 displayed by the display component given the contextual data 212, the display route 214, and the interest points together with the display content 210. A user can be provided with a graphical simulation of flying from an initial point on the display route 214 to an end point on such route 214, possibly pausing or altering perceived altitude upon approaching and/or reaching one of the interest points 216. For instance, the perceived altitude can be parabolic and/or quasi-parabolic in nature. In another example, an altitude can be capped, thereby maximizing a perceived altitude.

Figure 3:
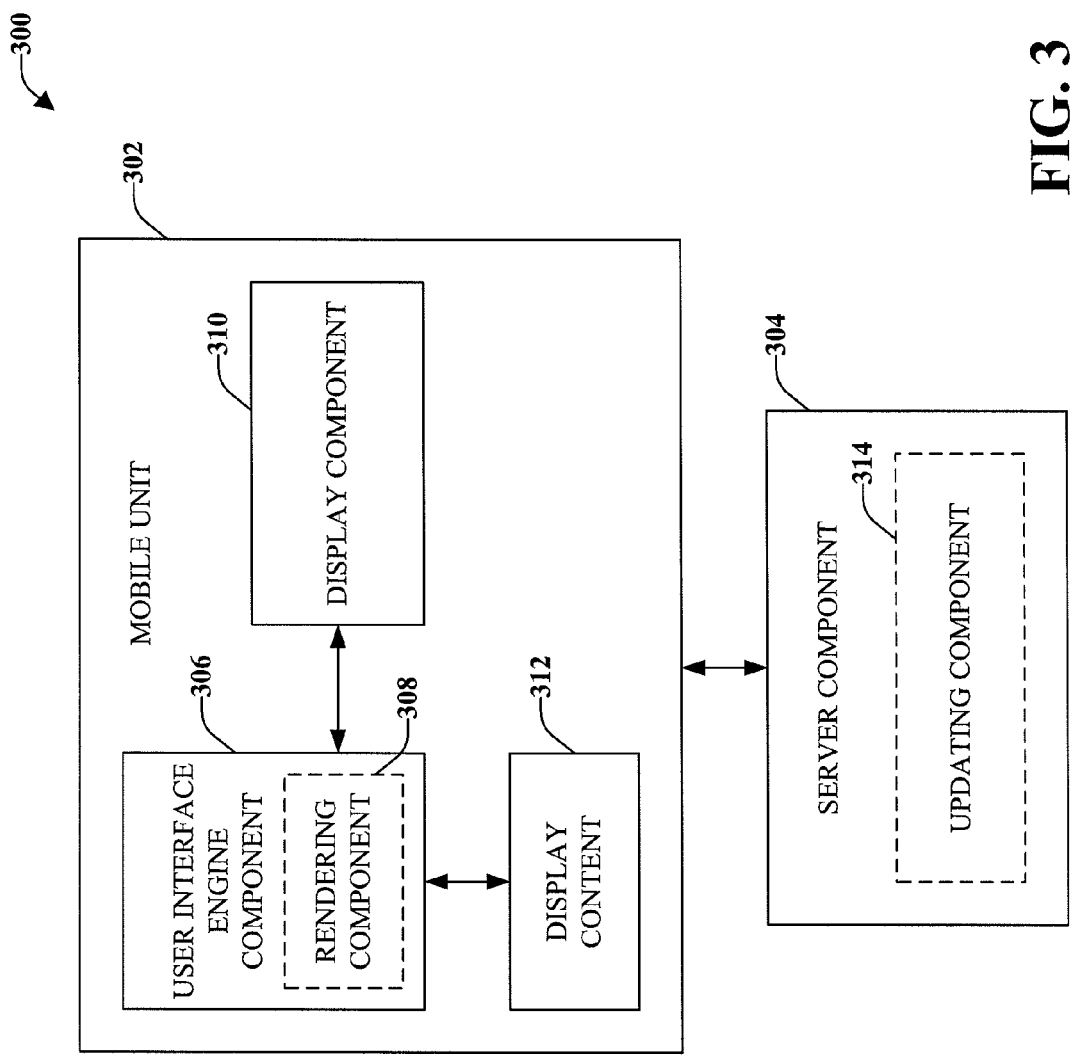
FIG. 3 is a block diagram of a system that facilitates updating display content associated with a mobile unit.

Now referring to FIG. 3, a system 300 that facilitates seamlessly providing a user with graphical images of a travel route is illustrated. The system 300 includes a mobile unit 302 that is communicatively coupled to a server component 304, wherein the mobile unit 302 and the server component 304 act cooperatively to automatically render and output a visual route of travel to a user. The mobile unit 302 can be a cellular telephone, a smartphone, a personal digital assistant, or any other suitable mobile unit, and can include a user interface engine component 306 that is employed to generate a graphical depiction of a route to a user. As described above, the route can be a route over a map or any other suitable object. The user interface engine component 306 can be associated with a rendering component 308 that is charged with rendering serialized data to a display component 310. The rendered data is related to display content 312, which can be electronic data relating to a map, a surface of an object, an image, and the like. The display component 310 can thus output a graphical depiction of a traversal of a route, wherein the route is represented within the display content 312. As described above, the output graphical depiction can be associated with altering perceptions of altitudes with respect to the route.

The server 304 component can house an updating component 314 that is tasked with updating the display content 312 as well as providing alterations associated with the display content 312 to the user interface engine component 308. For instance, as described above, the display content 312 can be stored within memory associated with the mobile unit 302, which can conserve processing resources with respect to the mobile unit 302. More specifically, the display content 312 need not be continuously analyzed and rendered by the rendering component 308, as such content 312 may have previously been rendered and is existent within memory. Situations can exist, however, that can make altering portions of the display content 312 desirable. For example, altering color of a portion of the display content 312 can be desirable in light of a sensed and/or predicted condition relating to the display content 312 (e.g., traffic congestion, an accident, . . . ). The updating component 314 can receive coordinate locations relating to portions of the display content 312 that are desirably updated, and present updates together with the coordinate locations to the user interface engine component 306. The rendering component 308 can then overlay the alterations upon the display content 312 at the appropriate coordinates and output a rendering to the display component 310. While the updating component 314 is shown as being resident upon the server 304, it is appreciated that such component 314 can be placed within the mobile unit 302 if the mobile unit is associated with sufficient processing and memory capabilities.

Figure 4:
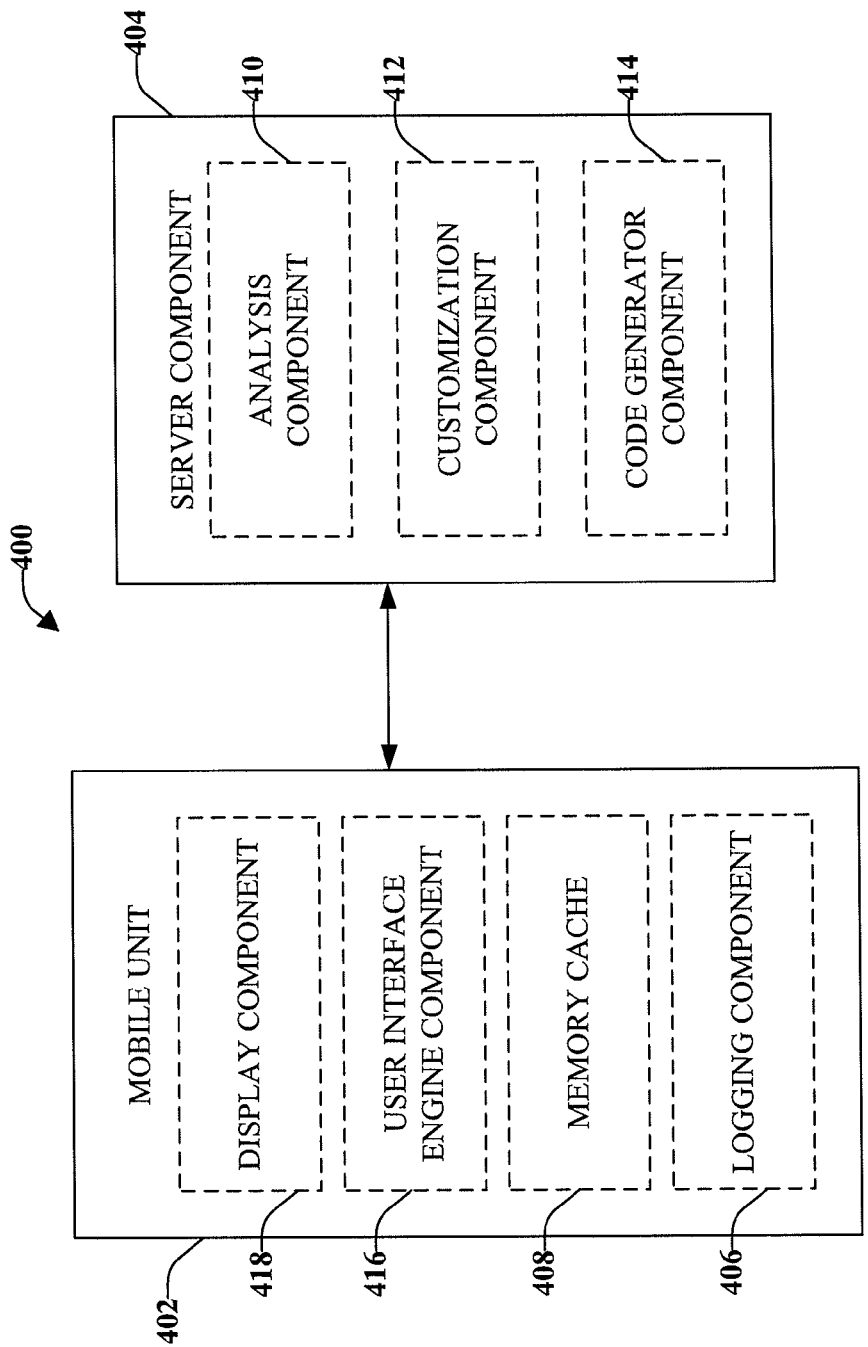
FIG. 4 is a block diagram of a system that facilitates utilizing contextual and/or historical data in connection with graphically depicting travel along a route.

Now turning to FIG. 4, a system 400 that facilitates providing a graphical depiction of a seamless traversal of a route is illustrated. The system 400 includes a mobile unit 402 that is communicatively coupled to a server component 404. For instance, the server component 404 can be a web server associated with the Internet, a server associated with a proprietary entity, or any other suitable server. Furthermore, the mobile unit 402 and the server component 404 can be communicatively coupled by way of the Internet, a wireless network (such as a cellular network), or any other suitable network. The mobile unit 402 includes a logging component 406 that is employed to obtain data relating to the mobile unit 402. For example, the logging component 406 can track disparate locations of the mobile unit 402 at intermittent or periodic times. Such location tracking can be accomplished by way of position sensors such as GPS sensors, monitoring handshakes between the mobile unit 402 and base stations, and the like. Furthermore, the logging component 406 can determine when the mobile phone 402 is active, when particular applications are employed, when a profile is set as being silent, or any other utilization of the mobile unit 402.

The mobile unit 402 can further include a memory cache 408 that at least temporarily stores data logged by the logging component 406. The memory cache 408 can be in the form of volatile and/or non-volatile memory, can be a removable disk, or any other suitable form of memory or data storage device. The mobile unit 402 can intermittently or periodically deliver data from the memory cache to an analysis component 410 related to the server component 404. The analysis component 410 can analyze the logged data and determine whether at least a portion of such data can be employed to customize a display application. For instance, the analysis component 410 can determine that times that a profile of the mobile unit 402 is set as silent are important and should not be discarded from the data received from the memory cache 408.

A customization component 412 receives an analysis undertaken by the analysis component and customizes a viewing application relating to the mobile unit 402. For instance, the customization component 412 can determine times and/or contexts in which displaying traversal of a particular route is beneficial. Furthermore, the customization component 412 can determine which routes should be displayed to a user. For example, logged data within the memory cache 408 can provide an indication of a route traveled by a user during a week. Accordingly, it can be inferred that the user will wish to be provided with a graphic depiction of the frequently traveled route, wherein the depiction illustrates actual and/or predicted traffic conditions. Moreover, the customization component 412 can determine times that the graphical depiction should be provided to the user as a function of the received logged data. A code generator component 414 can output code according to determinations made by the customization component, and such code can be delivered to the mobile unit 402. For instance, the code generator component 414 can output code that is utilized to initiate one or more applications resident upon the mobile unit 402. Similarly, the code generator component 414 can be employed to alter an application, such as to alter a route that is displayed by way of the mobile unit.

A user interface engine component 416 within the mobile unit 402 can receive code output by the code generator component 414 and utilize such code to display seamless traversal of a route. As described above, the user interface engine component 416 can assist in providing a user with a graphical traversal of a route, wherein a user is provided with a perception of flying over such route. A display component 418, which can include a screen, is employed to provide the aforementioned graphical depiction.

Figure 5:
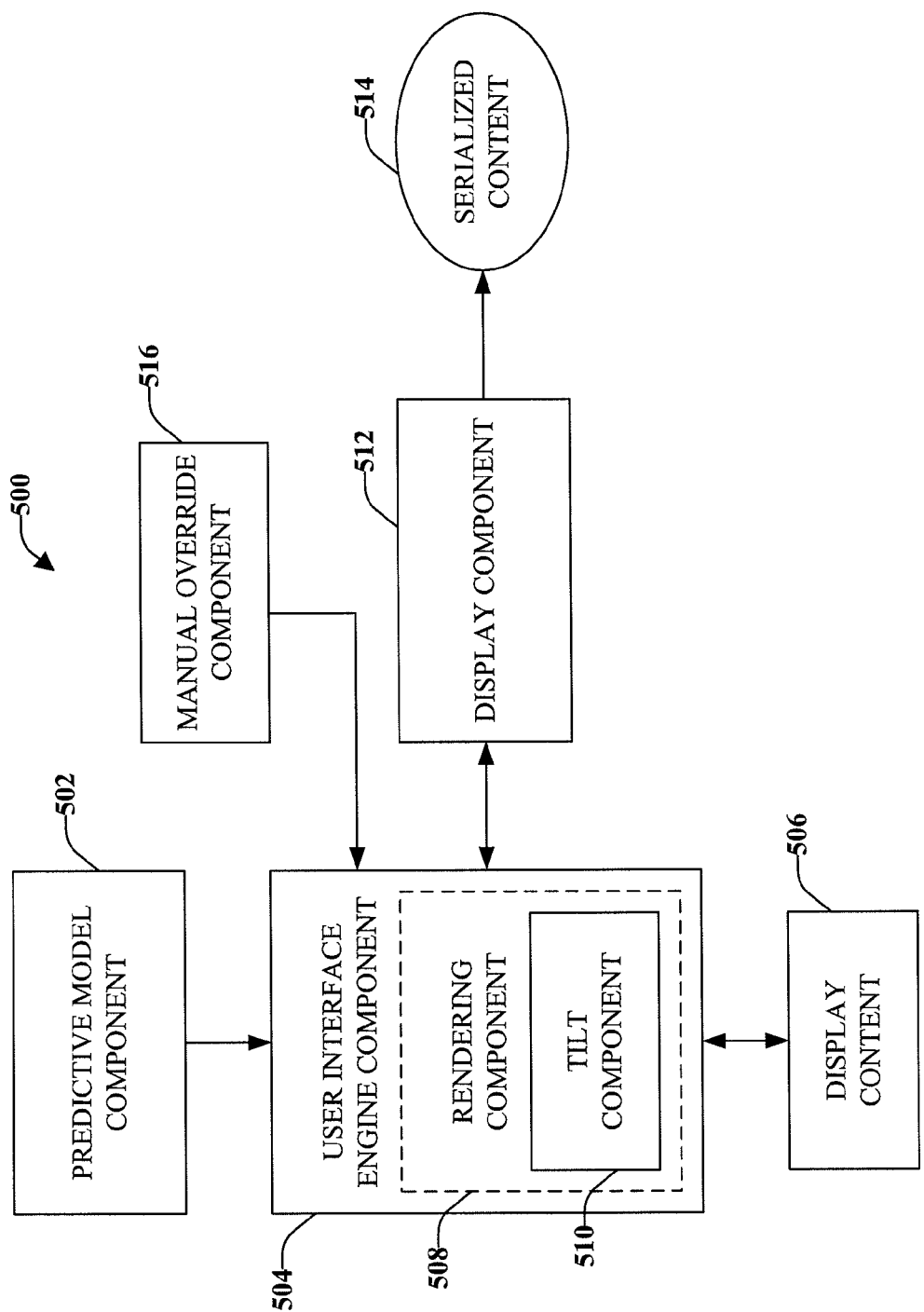
FIG. 5 is a block diagram of a system that facilitates manually altering a graphical depiction of travel along a route.

Now referring to FIG. 5, a system 500 that facilitates providing a graphical rendering of a route to a user is illustrated, wherein perceived altitude associated with the route alters as a function of distance between a beginning and end point of the route. The system 500 includes a predictive model component 502 that can be employed to predict parameters relating to traffic. For instance, data can be collected with respect to particular roadways, and a classifier can be trained based at least in part upon the data. Furthermore, the predictive model component 502 can include Bayesian networks, vector support machines, or any other suitable algorithm/mechanism/component that can aid in prediction of traffic parameters. The predictive model component 502 can further employ probabilistic techniques in connection with predictive parameters relating to traffic, including congestion, accidents, and the like. For example, a process for determining predictions can be facilitated by way of an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the claimed subject matter can employ classifiers that are explicitly trained (e.g., by way of a generic training data) as well as implicitly trained (e.g., by way of observing user behavior, receiving extrinsic information). For example, SVM's are configured by way of a learning or training phase within a classifier constructor and feature selection module. Thus, the classifier(s) can be used to automatically learn and perform a number of functions, including but not limited to determining according to a predetermined criteria.

Predictions output by the predictive model component 502 can be received by a user interface engine component 504 that is employed in connection with providing a robust graphical depiction of a route of travel that may be taken by a user. For example, the route of travel can be pre-defined by a user and/or learned over time as a function of collected data. The user interface engine component 504 can receive and/or be associated with display content 506, wherein such content can be a map, an image, an object, etc. A rendering component 508 receives the display content 506 together with predictions output by the predictive model component 502 to generate a serialized depiction of the route. In one example, the user interface engine component 504 can be associated with an ability to render three-dimensional images, and can include a tilt component 510 to provide visual effects associated therewith. For instance, while graphically depicting a turn in a route, the tilt component 510 can cause a user to perceive a banking experience. Again, an analogy to flying can be made, as perceived velocity can affect a level of banking. Other visual output techniques are also contemplated by the inventor and are intended to fall under the scope of the hereto-appended claims.

The user interface engine component 504 can output serialized data to a display component 512 that can provide serialized content 514 to a user. The serialized content 514 enables a user to experience a seamless traversal of a route. The system 500 further includes a manual override component 516 that enables a user to manually alter a route, a perceived velocity of traversal, a perceived altitude associated with a graphical output, etc. For instance, buttons can exist on a mobile unit, wherein depression of one or more of the buttons causes manual override of the described automatic display. Similarly, a mobile unit can be associated with a pressure sensitive screen, and selection of an element on such screen (through utilization of a wand, a finger, or the like) can cause a manual override. Further, the manual override component 516 can include voice recognition capabilities, wherein voice commands can alter content provided to and displayed by the display component 512. With more detail regarding the manual override component 516, a flyover sequence can be initiated by selecting a button associated with the manual override component, and immediately stopped by selecting a button (the same or different button) during a flyover sequence. Stopping a flyover can cause an initial view to be provided to the user (a view that was displayed at a starting point of the flyover). Similarly, the initial view can be provided to a user upon completion of a flyover. Furthermore, the manual override component 516 can be employed to cause a view of a subsequent region of interest to be displayed for inspection. Other manual alterations of a flyover are also contemplated by the inventor, and the aforementioned exemplary list of functionalities is not intended to be limitative.

Referring now to FIGS. 6-9, methodologies in accordance with the claimed subject matter will now be described by way of a series of acts. It is to be understood and appreciated that the claimed subject matter is not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
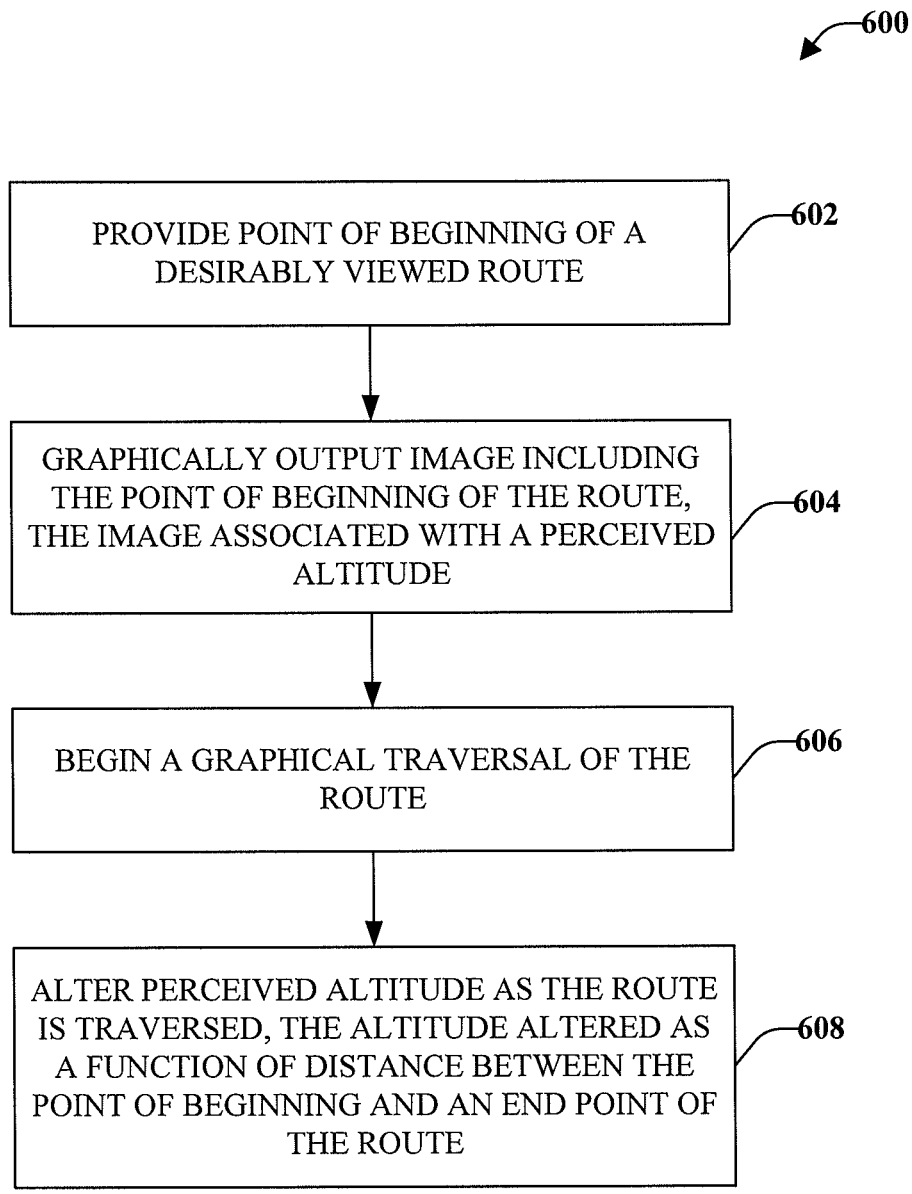
FIG. 6 is a representative flow diagram illustrating a methodology for graphically displaying travel along a route, wherein perceived altitude associated with the route changes.

Turning to solely to FIG. 6, a methodology 600 that facilitates providing a graphical rendition of a route is illustrated. At 602, a point of beginning of a desirably viewed route is provided. For example, the point of beginning can be indicated by coordinates upon a map, an image, or the like, wherein the map and/or image is stored in memory. At 604, an image is graphically output to a user, wherein the image includes a point of beginning of the route. Furthermore, the image is associated with a perceived altitude. For instance, the altitude can be perceived as a relatively low altitude, thus providing a user with a close view of the point of beginning. At 606, a graphical traversal of the route is begun. More particularly, the display is altered so that the user perceives movement from the point of beginning of the route towards an end point of the route. At 608, the perceived altitude is altered as the route is traversed. Specifically, the perceived altitude is altered as a function of distance between a point of beginning and an end point of the route. Thus, a user is provided with a greater amount of context, akin to an airplane taking off. As the end point is neared, the perceived altitude lessens. The point of beginning and end point of the route can be calculated through utilization of coordinates associated with such points within the display content.

Figure 7:
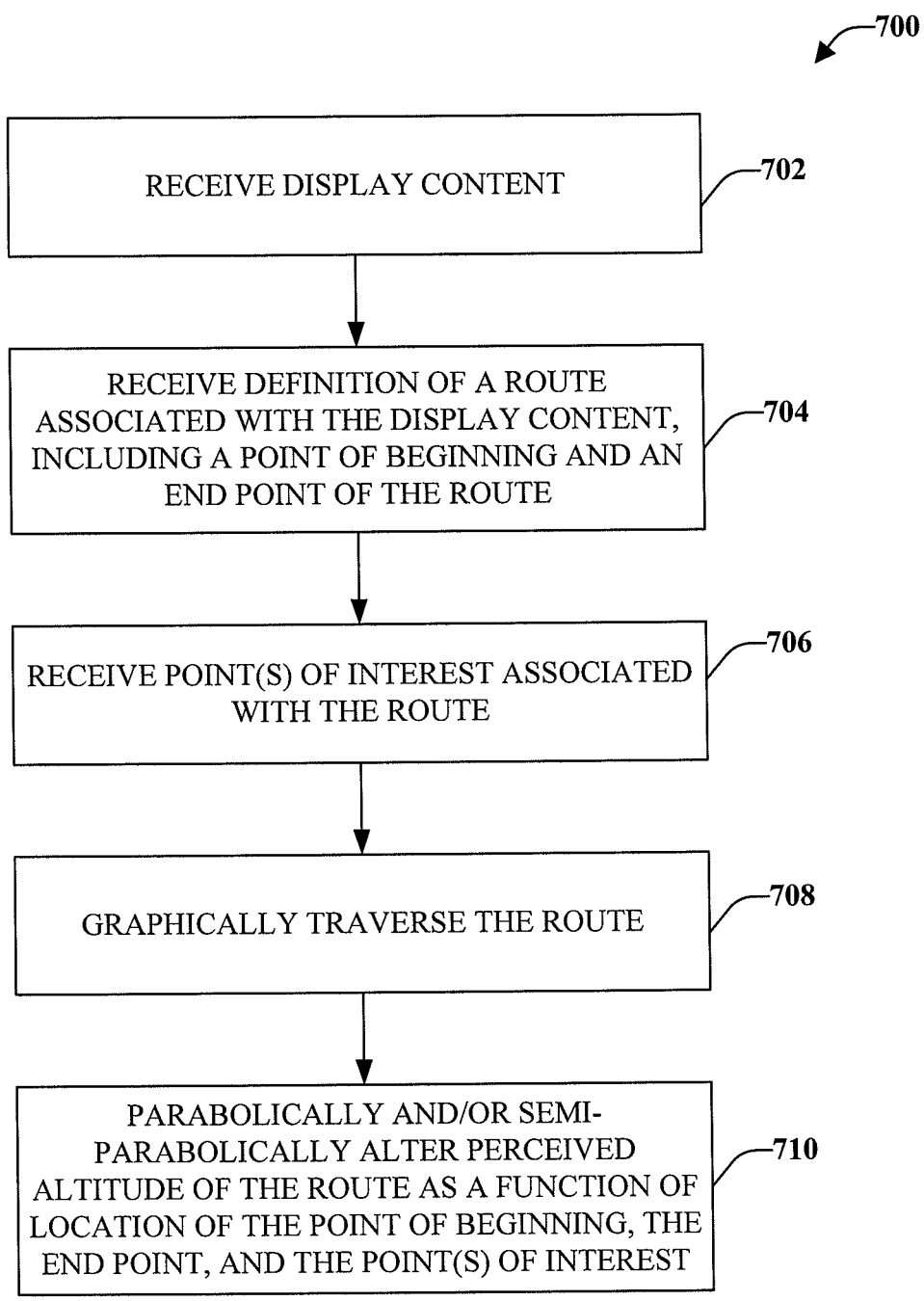
FIG. 7 is a representative flow diagram illustrating a methodology for graphically depicting travel along a route as a function of points of interest associated with the route.

Now referring to FIG. 7, a methodology 700 that facilitates providing a user with a graphical depiction of traversal of a route is illustrated. At 702, display content is received, wherein such content can be a map, an image, an object, etc. At 704, a definition of a route associated with the display content is received, wherein the definition of the route includes a point of beginning and an end point of the route. For example, the definition of the route can include various roadways that begin in a first location and end in a second location. The beginning and end points of the route can be associated with coordinates within the display content. At 706, point(s) of interest associated with the route are received. For example, and as described more fully above, the points of interest can be explicitly defined by a user, defined through contextual data and rules, and/or defined by way of performing inferences. More specifically, the points of interest can be portions of roadway within the route that are subject to congestion above a threshold. At 708, the route is graphically traversed, for example, upon a display of a mobile unit. At 710, perceived altitude associated with display of the traversed route is altered as a function of the point of beginning, the end point, and the point(s) of interest. For example, the perceived altitude can lessen as points of interest are neared and/or the end point is neared, and can heighten as points of interest are traversed over.

Figure 8:
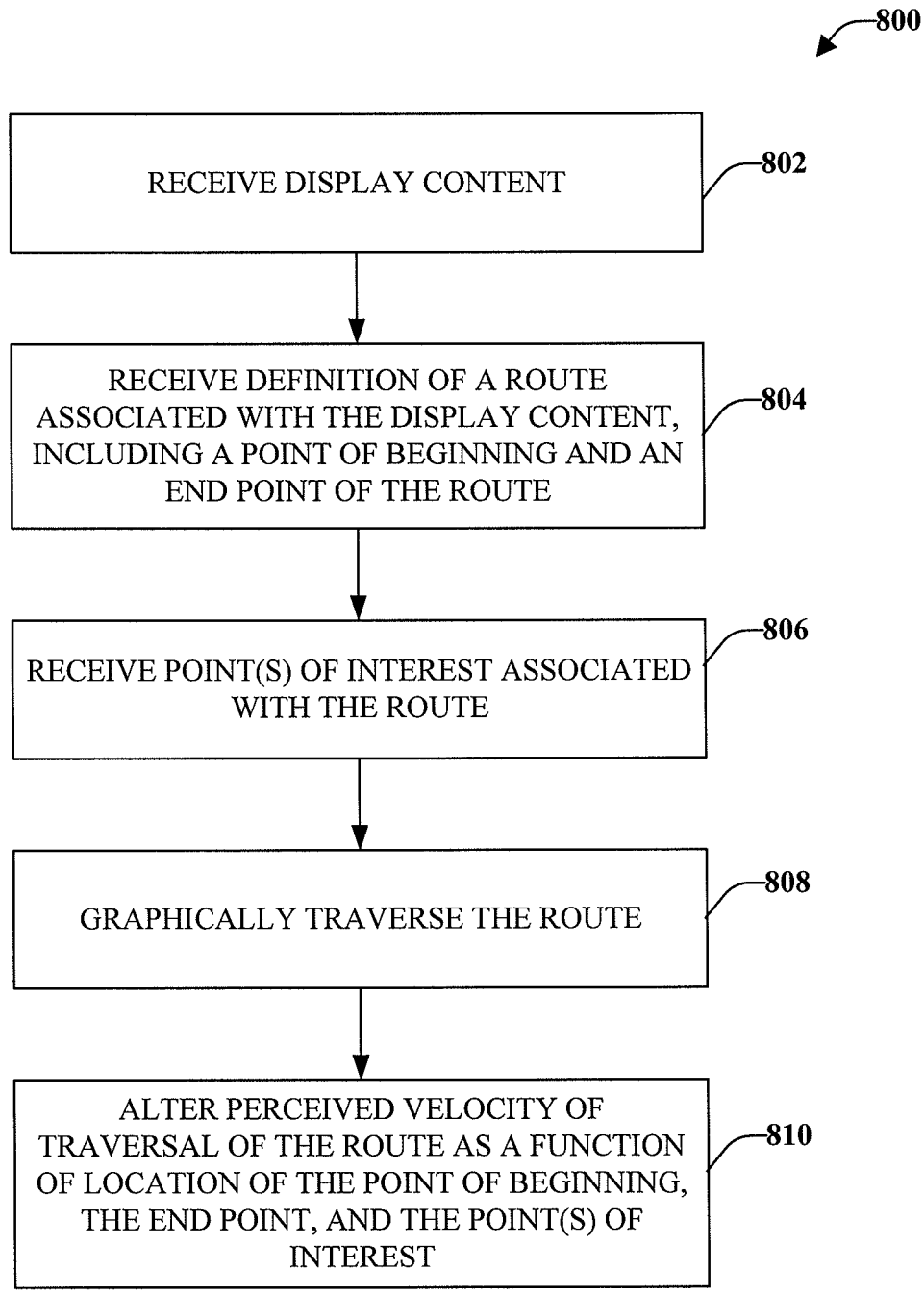
FIG. 8 is a representative flow diagram illustrating a methodology for altering perceived velocity associated with a graphical depiction of travel along a route.

Turning now to FIG. 8, a methodology for serially displaying a route of travel to a user is illustrated. At 802, display content is received, and at 804 a definition of a route associated with the display content is received. For example, the route can be a route desirably viewed over an image, object, and/or map. Furthermore, the route can be associated with a beginning point and end point, wherein coordinates associated with such points can be utilized to locate their position within the display content. At 806, point(s) of interest are associated with the route (e.g., points where a user may wish to review a map, image, and/or object in greater detail). At 808, the route is graphically traversed, where traversal is enabled through serialization of portions of the display content. At 810, perceived velocity of traversal of the route is altered as a function of a location of the point of beginning, the end point, and the point(s) of interest. For instance, as the graphical traversal nears a point of interest, a perceived velocity of traversal can be lessened, thereby providing a user with additional time to review and contemplate data with respect to the point of interest. In another example, the traversal can be temporarily paused as such traversal reaches a point of interest.

Figure 9:
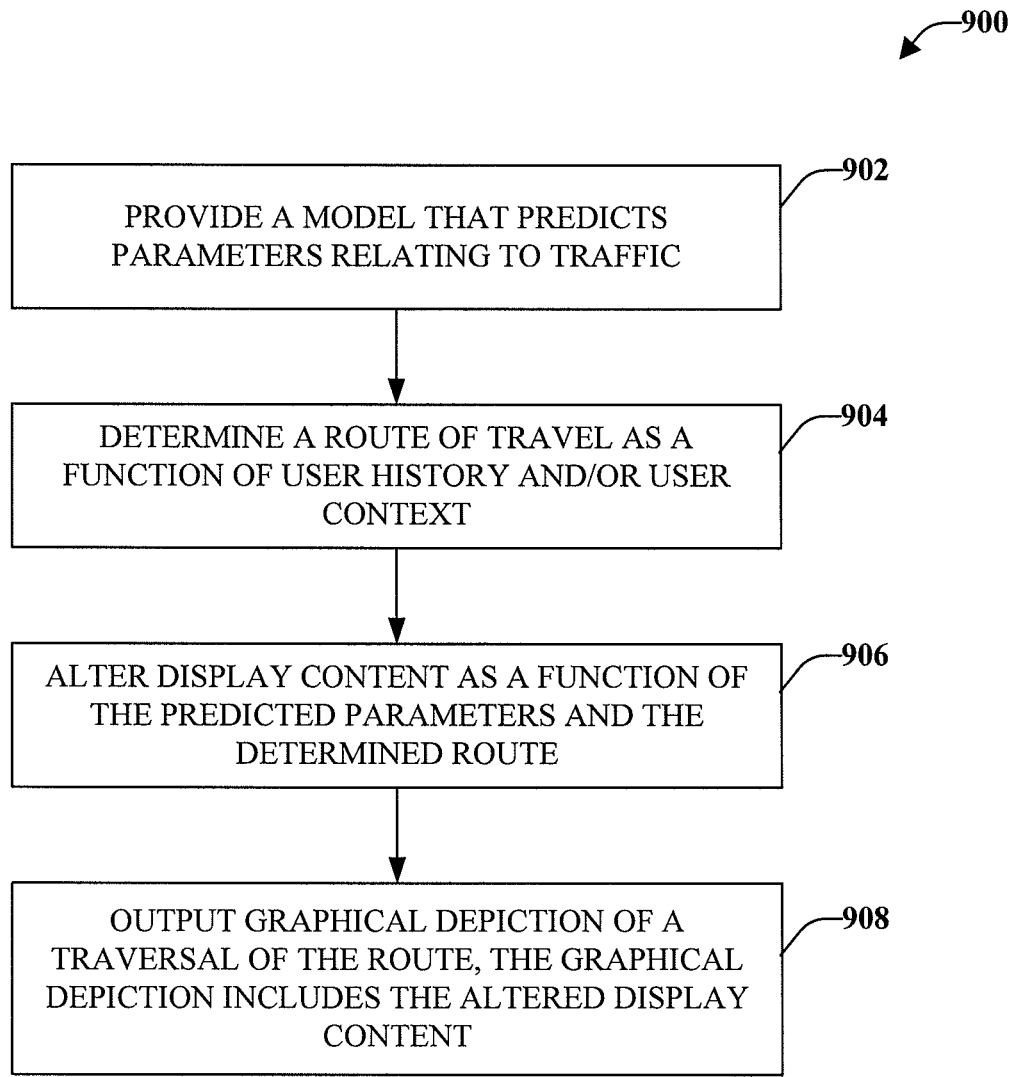
FIG. 9 is a representative flow diagram illustrating a methodology for altering display content associated with a mobile unit.

Now turning to FIG. 9, a methodology 900 that facilitates providing a user with a graphical depiction of a traffic route on a mobile unit is illustrated. At 902, a model is provided that can predict parameters relating to traffic. As described in more detail above, the model can be created by way of utilizing classifiers to train such model. Furthermore, the predictive model can predict various parameters relating to traffic, including level of congestion, predicted time that levels of congestion will occur, a predicted time that a portion of road will remain congested, etc. At 904, a route of travel is determined as a function of user history and/or user context. For instance, data can be collected that indicates that a user travels a particular route from a place of business to a place of residence every Monday through Friday, excluding holidays. Thus, it can be inferred that the route of travel will be a route that such user typically employs, wherein the point of beginning is the place of business and an end point is the place of residence. In another example, data can be collected that indicates that the user is traveling upon a highway in a particular direction. Thus, the route can be provided as a function of current user context (e.g., the current position on the highway to an inferred end point).

At 906, display content resident within a mobile unit as altered as a function of predicted parameters and the determined route. In one example, display content can include roads that are divided into several portions, wherein each of the portions is associated with a color of white. It can be known that road portions colored white are not subject to congestion, and road portions colored black are subject to high congestion. The predictive model can predict high congestion for a portion of road relating to the route and within the display content, and coordinates of such portion along with a desired color change can be delivered to the mobile unit. A user interface engine can then be employed to make such alterations. At 908, the graphical depiction of a traversal of the route is output, wherein the graphical depiction includes the altered display content. Accordingly, a user can be provided with important information with respect to the route.

Figure 10:
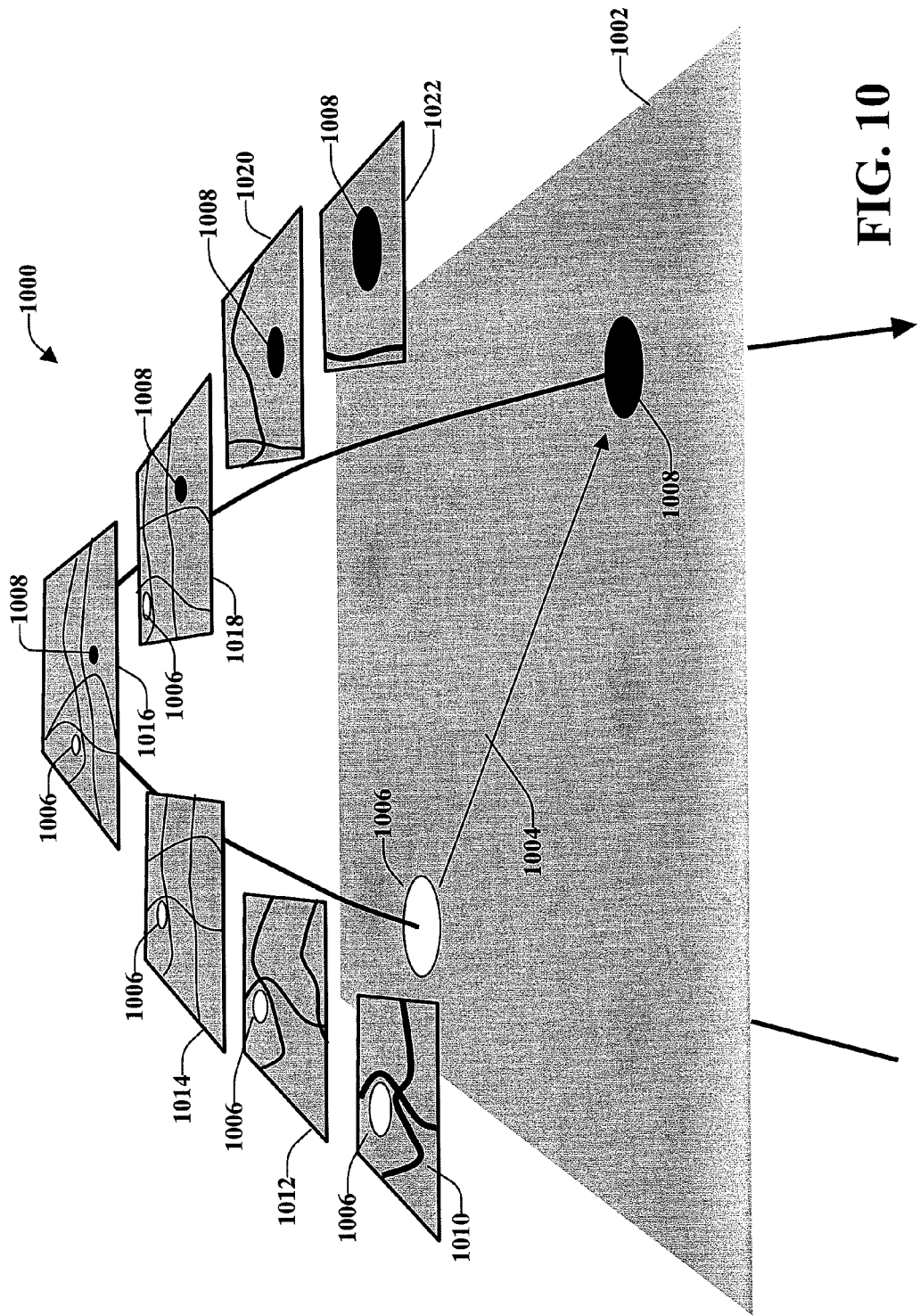
FIG. 10 is an exemplary sequence of displays.

Turning now to FIG. 10, an exemplary sequence of displays 1000 is illustrated. The sequence of displays 1002 can occur within an area 1002, wherein the area 1002 can be included within display content. A route 1004 can be selected between a beginning point 1006 of the route 1004 and an endpoint 1008 of the route 1004. At a first display 1010, the beginning point 1006 is illustrated from a user perspective associated with a relatively low altitude. At a second display 1012, it can be determined that the route 1004 is being traversed while a perceived altitude of a user from the area 1002 is heightened. In particular, a user will perceive that the beginning point 1006 is further below such user, thus providing a greater context with respect to the area 1002. A third display 1014 shows the beginning point 1006 being viewed from yet a higher altitude, and a fourth display 1016 enables view of both the beginning point 1006 and the end point 1008. The display 1016 illustrates the sequence 1000 at a highest perceived altitude with respect to the area 1002.

A fifth display 1018 also enables viewing of both the beginning point 1006 and the end point 1008, but the perceived altitude with respect to the area 1002 is lessened and the route 1004 is further traversed than when compared to the display 1016. A sixth and seventh display 1020 and 1022, respectively, further illustrate lessening of altitude with respect to the area 1002, thereby providing a user with a more detailed view of the end point 1008. As can be discerned from reviewing the sequence 1000, the displays 1010-1022 illustrate viewing the route 1004 in a parabolic manner. Furthermore, while the sequence 1000 illustrates disjoint displays, it is understood that the claimed subject matter contemplates a seamless graphical depiction of traversal of the route 1004.

Figure 11:
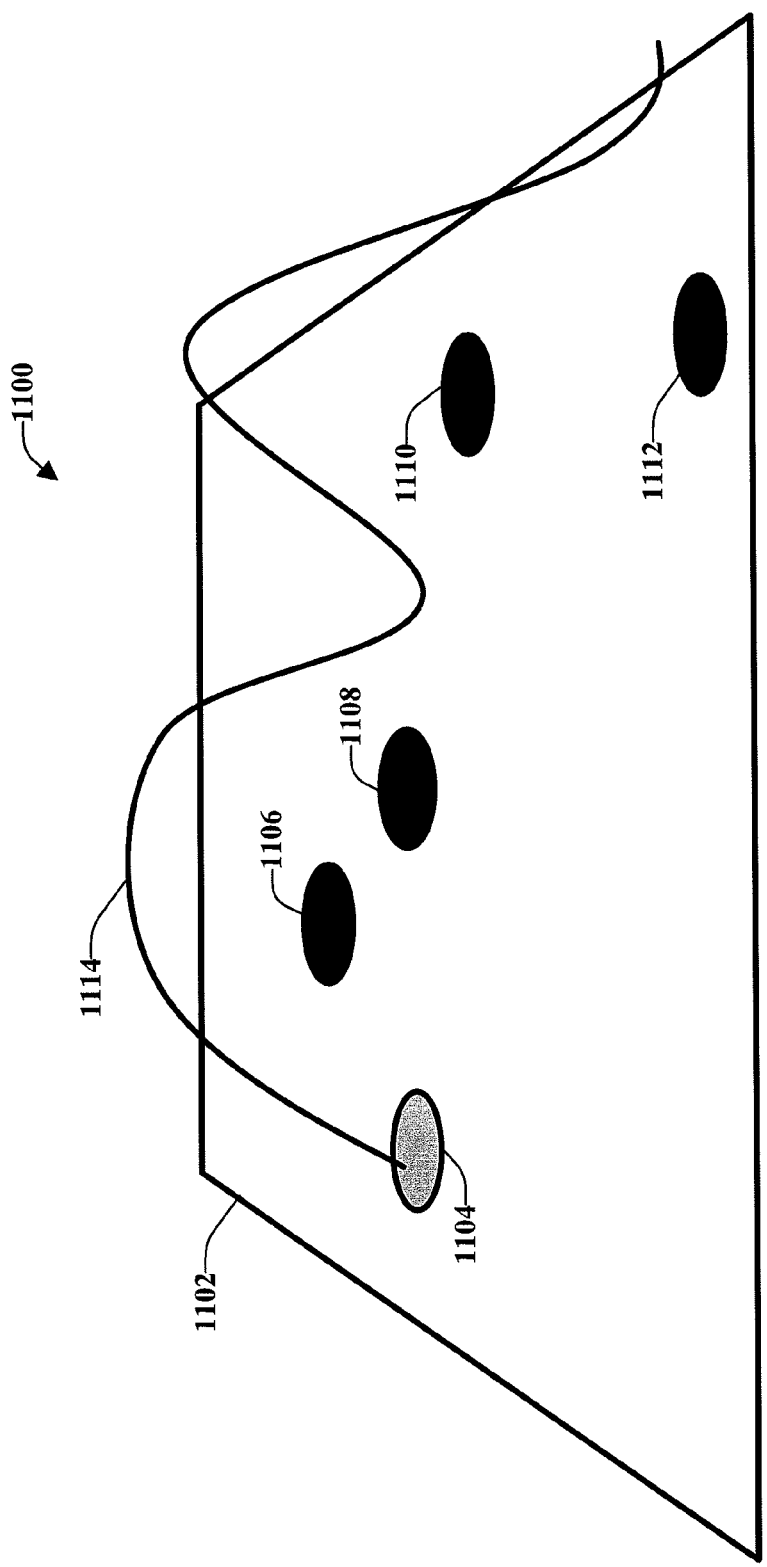
FIG. 11 is an exemplary representation of a graphical depiction of travel along a route.

Referring now to FIG. 11, a graphical representation 1100 of a graphical depiction of a route traversal is illustrated. The representation 1100 includes an area 1102 with a beginning point 1104 of a route (not shown). An end point of the route lies outside the area 1102 and is not depicted. The area 1102 further includes several points of interest 1106-1112, wherein such points can be explicitly and/or implicitly defined, and can further be defined through inference. The representation 1100 further includes a line 1114 that represents a view that can be provided by way of one or more features described herein with respect to the area 1102, the beginning point 1104, and the points of interest 1106-1112. The points of interest 1106-1112 can be weighted, which can affect a manner in which a traversed route is graphically depicted to a user.

Figure 13:
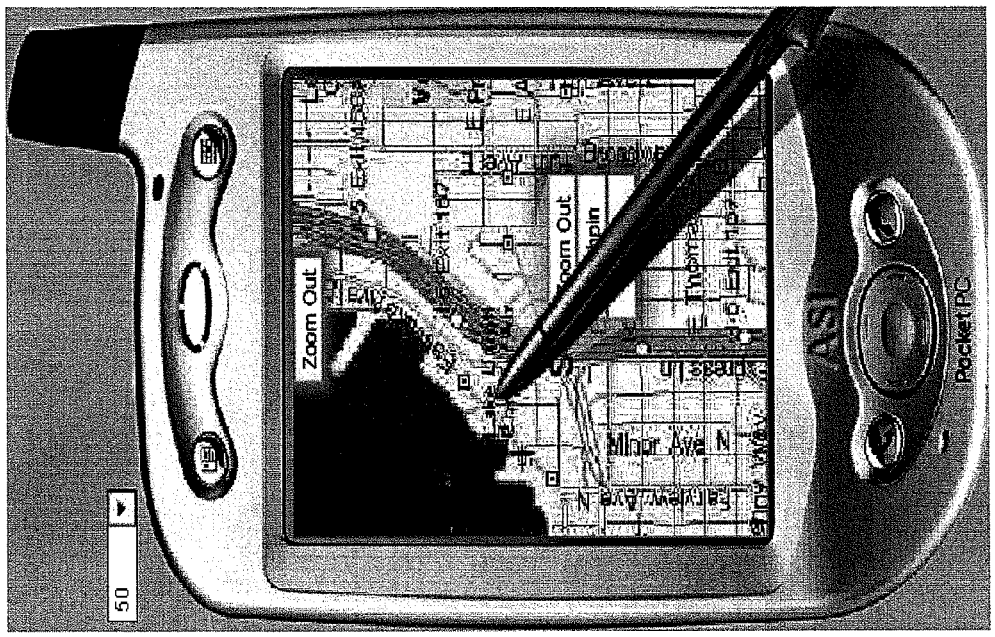
FIGS. 12 and 13 are exemplary mobile units.
Figure 12:
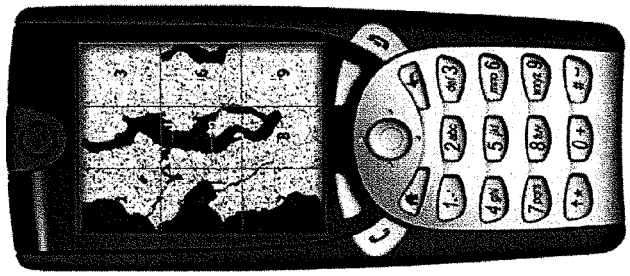

Turning briefly to FIG. 12, an exemplary smartphone device 1200 that can display maps of geographic regions is illustrated. A display upon the smartphone device 1200 can display a dynamic traversal of a route to a user. FIG. 13 illustrates another exemplary device 1300 (e.g., a PDA) that can illustrate predictive outputs as well as dynamically altering maps showing a user a travel route.

Figure 14:
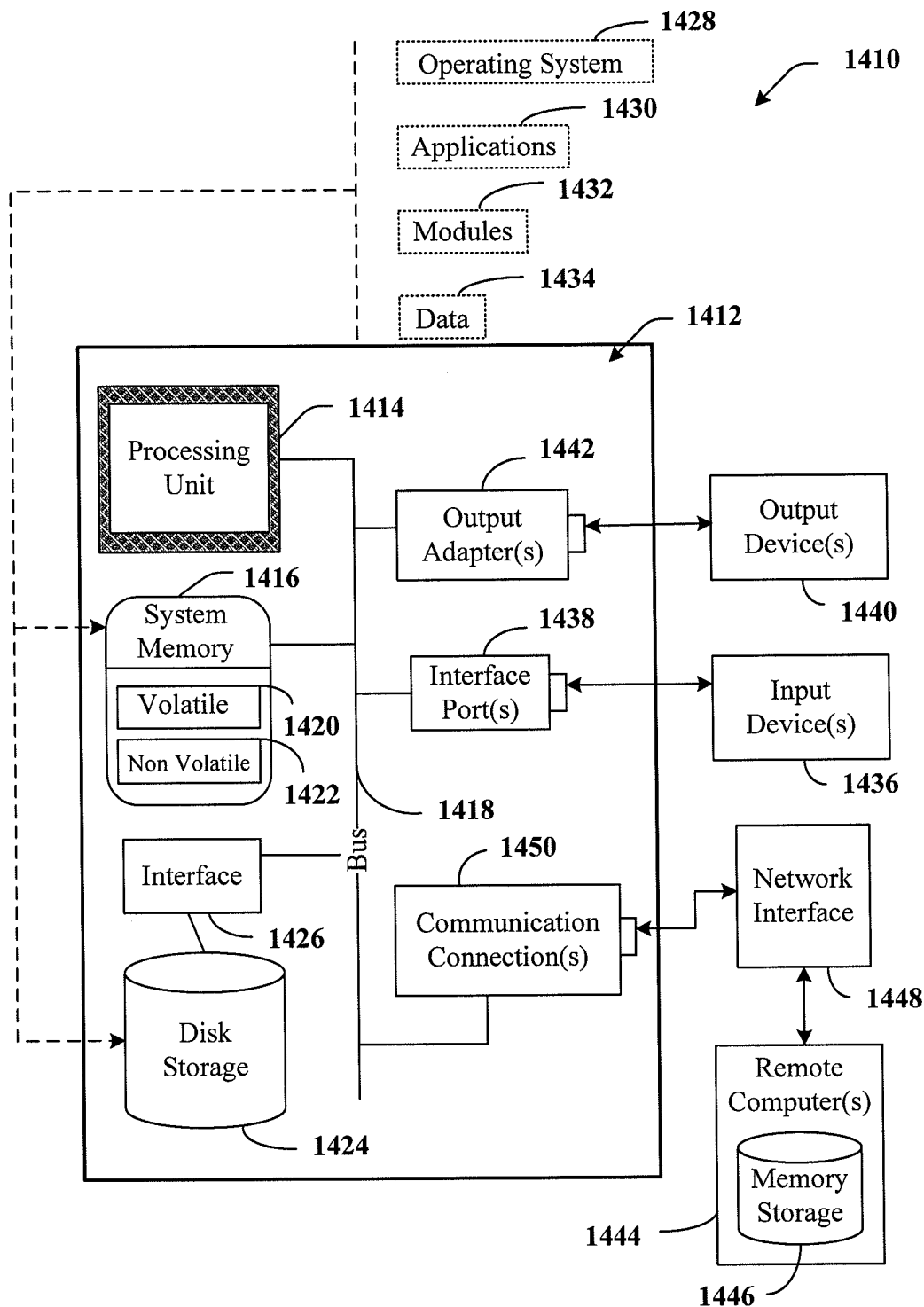
FIG. 14 is a schematic block diagram illustrating a suitable operating environment in accordance with an aspect of the claimed subject matter.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
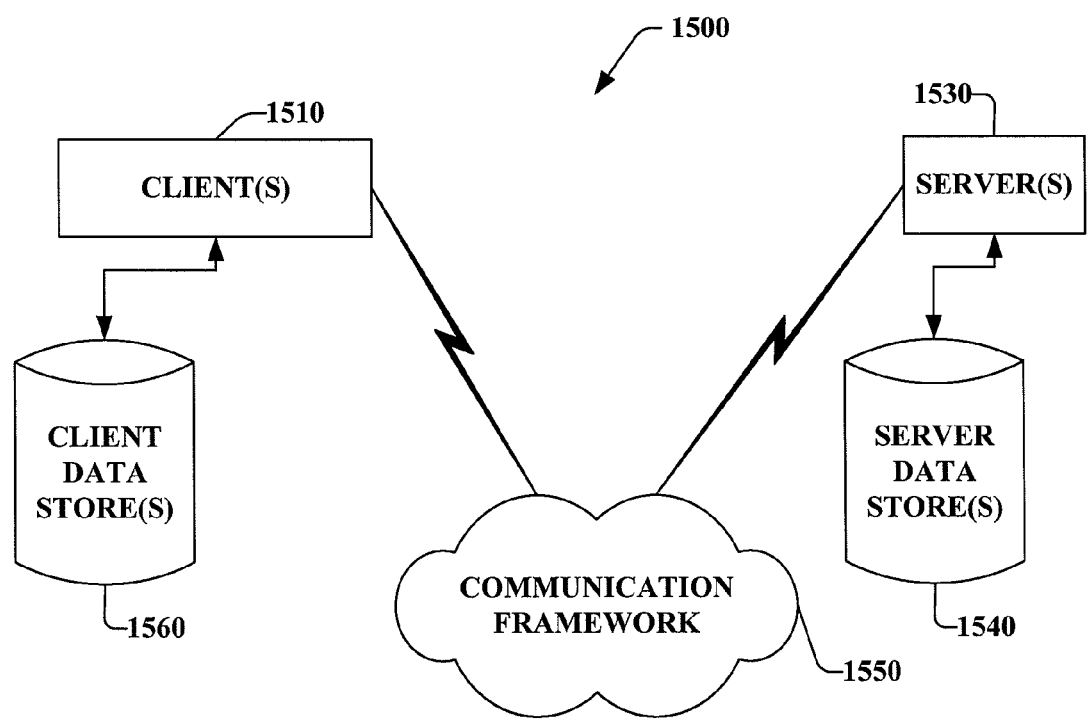
FIG. 15 is a schematic block diagram of a sample-computing environment.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the claimed subject matter. It is, of course, not possible to describe every conceivable combination of components or methodologies, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium encoded with computer-executable instructions for performing operations that dynamically compose a sequence of views of an object, the operations comprising:
   receiving display content for the sequence of views;
   automatically rendering the sequence of views to create a graphical depiction of traversal of the object, including:
      determining an amount of time to display a particular view of the sequence of views, the amount of time selected for the particular view based at least in part on at least one of:
         a complexity of at least a portion of the object depicted in the particular view, and
         an indication of a user's familiarity with at least the portion of the object depicted in the particular view; and
   displaying the rendered sequence of views on an output device.

2. The computer-readable storage medium of claim 1, wherein displaying the rendered sequence of views includes:
   displaying the particular view of the sequence of views for the determined amount of time.

3. The computer-readable storage medium of claim 1, wherein automatically rendering the sequence of views includes:
 determining amounts of time to display each view of the sequence of views.

4. The computer-readable storage medium of claim 1, wherein determining the amount of time to display the particular view is also based on a location of the particular view within the sequence of views.

5. The computer-readable storage medium of claim 1, wherein the object comprises at least one of a calendar and a representation of task information.

6. The computer-readable storage medium of claim 1, wherein the object comprises a map.

7. The computer-readable storage medium of claim 1, wherein the object comprises a map, and wherein the graphical depiction of traversal of the object includes representations of at least one traffic pattern.

8. The computer-readable storage medium of claim 1, wherein the operations further comprise:
 selecting a zoom level for the particular view based at least in part on a position of at least the portion of the object depicted in the particular view relative to another position.

9. The computer-readable storage medium of claim 1, wherein the object is a three-dimensional object, and wherein automatically rendering the sequence of views includes:
 automatically rendering the sequence of views to provide a perception of altitude change in the rendered sequence.

10. A method of displaying a sequence of views of an object, the method comprising:
 receiving display content for the sequence of views;
 automatically generating the sequence of views to create a graphical depiction of traversal of the object, including:
  determining an amount of time to display a particular view of the sequence of views, the amount of time selected for the particular view based at least in part on at least one of:
   a complexity of at least a portion of the object depicted in the particular view, and
   an indication of a user's familiarity with at least the portion of the object depicted in the particular view; and
 displaying the particular view of the sequence of views for the determined amount of time.

11. The method of claim 10, the method further comprising:
 displaying another view of the sequence of views for another determined amount of time.

12. The method of claim 10, wherein the object comprises at least one of a calendar and a representation of task information.

13. The method of claim 10, wherein the object comprises a map, and wherein the graphical depiction of traversal of the object includes representations of traffic information.

14. The method of claim 10, wherein the object is a three-dimensional object, and wherein automatically generating the sequence of views includes:
 generating aspects in the sequence of views that provide a perception of altitude change as the generating sequence is displayed on the output device.

15. A computer-readable storage medium encoded with computer-executable instructions for performing operations that provide a dynamically composed sequence of views, the operations comprising:
 constructing a flyover of a representation of an object; and
 generating a graphical depiction of the flyover for display on a portable device such that:
  a velocity of the flyover is generated as a function of at least one of:
   a complexity of at least a portion of the object to be depicted by the flyover, and
   an indication of a user's familiarity with at least the portion of the object to be depicted by the flyover.

16. The computer-readable storage medium of claim 15, wherein a magnification level of the flyover is generated as a function of distance from a point of interest of the flyover.

17. The computer-readable storage medium of claim 15, wherein the object comprises a map, and wherein the graphical depiction of the flyover of the object includes representations of traffic information.

18. The computer-readable storage medium of claim 15, wherein the object is a three-dimensional object, and wherein generating the graphical depiction of the flyover includes:
 generating aspects of the graphical depiction of the flyover that simulate a perception of altitude change.

19. The computer-readable storage medium of claim 18, wherein the perception of altitude change includes a perception of an altitude increase in a first portion of the flyover and a perception of an altitude decrease in a second portion of the flyover, and wherein the first portion precedes the second portion.

20. The computer-readable storage medium of claim 18, wherein the perception of altitude change is parabolic or quasi-parabolic.

* * * * *